US009758905B2

(12) United States Patent
Alnasleh et al.

(10) Patent No.: US 9,758,905 B2
(45) Date of Patent: Sep. 12, 2017

(54) PROCESS OF MAKING CARBON FIBERS DERIVED FROM LIGNIN/CARBON RESIDUE

(71) Applicant: GrafTech International Holdings Inc., Independence, OH (US)

(72) Inventors: Bassam Alnasleh, Parma Heights, OH (US); Ching-Feng Chang, Strongsville, OH (US); Omer Gul, Olmsted Falls, OH (US); Andrew Hausner, Parma Heights, OH (US); Robert Miller, Southaven, MS (US); Orest Adrianowycz, Broadview Heights, OH (US)

(73) Assignee: GrafTech International Holdings Inc., Brooklyn Heights, OH (US)

( * ) Notice: Subject to any disclaimer, the term of this patent is extended or adjusted under 35 U.S.C. 154(b) by 193 days.

(21) Appl. No.: 14/440,411

(22) PCT Filed: Nov. 5, 2013

(86) PCT No.: PCT/US2013/068388
§ 371 (c)(1),
(2) Date: May 4, 2015

(87) PCT Pub. No.: WO2014/078120
PCT Pub. Date: May 22, 2014

(65) Prior Publication Data
US 2015/0284880 A1   Oct. 8, 2015

Related U.S. Application Data

(60) Provisional application No. 61/727,190, filed on Nov. 16, 2012.

(51) Int. Cl.
| | | |
|---|---|---|
| *C01B 31/02* | (2006.01) | |
| *C08L 97/00* | (2006.01) | |
| *D01D 5/08* | (2006.01) | |
| *D01F 9/15* | (2006.01) | |
| *D01F 9/155* | (2006.01) | |
| *D01F 9/17* | (2006.01) | |
| *C07G 1/00* | (2011.01) | |
| *D01F 9/145* | (2006.01) | |
| *C08H 7/00* | (2011.01) | |
| *C08L 95/00* | (2006.01) | |

(52) U.S. Cl.
CPC ............... *D01F 9/17* (2013.01); *C07G 1/00* (2013.01); *C08H 6/00* (2013.01); *C08L 97/005* (2013.01); *D01F 9/145* (2013.01); *C08L 95/00* (2013.01)

(58) Field of Classification Search
CPC .. C01B 31/02; C07G 1/00; C08H 6/00; C08L 97/00; C08L 97/005; D01D 5/08; D01F 9/145; D01F 9/15; D01F 9/155; D01F 9/17

USPC ................ 264/29.2, 211, 211.11; 423/447.1; 527/400; 530/500, 504
See application file for complete search history.

(56) References Cited

U.S. PATENT DOCUMENTS

| | | | |
|---|---|---|---|
| 2,429,102 | A | 10/1947 | Lewis et al. |
| 5,344,921 | A | 9/1994 | Sudo |
| 5,709,774 | A | 1/1998 | Naieni |
| 6,855,180 | B1 | 2/2005 | Pinatti |
| 2008/0185112 | A1 | 8/2008 | Argyropoulos |
| 2008/0317661 | A1 | 12/2008 | Eckert et al. |

(Continued)

FOREIGN PATENT DOCUMENTS

| | | |
|---|---|---|
| JP | H04194029 A | 7/1992 |
| KR | 20110116604 A | 10/2011 |

(Continued)

OTHER PUBLICATIONS

International Search Report from corresponding International Application No. PCT/US2013/68388, Dated Feb. 28, 2014.
Luo, J. "Lignin-Based Carbon Fiber" (Thesis). The University of Maine, May 2010.
Manufacturing: Synthetic and Cellulosic Fiber Formation Technology, downloaded from the Internet at <<http://www.fibersource.com/f-tutor/techpag.htm>>on Mar. 19, 2015.
Horst Nimz, "Beech Lignin- Proposal of a Constitutional Scheme", Angew. Chem. internat. Edit, vol. 13, 1974, No. 5, pp. 313-321.
Nunn et al., "Product Compositions and Kinetics in the Rapid Pyrolysis of Milled Wood Lignin", American Chemical Society, Ind. Eng. Chem. Process Des. Dev., vol. 24, 1985, pp. 844-852.

(Continued)

*Primary Examiner* — Leo B Tentoni (57) ABSTRACT

A method of making a carbon fiber comprising esterification of a lignin precursor with an acid, acid anhydride, or acyl halide, thereby forming a reduced $T_g$ lignin. Mixing the reduced $T_g$ lignin with a carbon residue selected from the group of coal based raw material, petroleum based raw material and combinations thereof, thereby forming a fiber precursor mixture; and spinning the fiber precursor mixture into a fiber. A method of making a carbon fiber comprising esterification of a lignin with an acid derivative, thereby forming a reduced $T_g$ lignin. Mixing the reduced $T_g$ lignin with a pitch, thereby forming a fiber precursor mixture; and spinning the fiber precursor mixture into a fiber. A method of making a carbon fiber comprising lowering the $T_g$ of a lignin material, thereby forming a reduced $T_g$ lignin. Mixing the reduced $T_g$ lignin with a carbon residue, thereby forming a fiber precursor mixture and spinning the fiber precursor mixture into a fiber.

19 Claims, 3 Drawing Sheets

(56) References Cited

U.S. PATENT DOCUMENTS

2013/0183227 A1    7/2013  Wohlmann
2014/0099505 A1*   4/2014  Thunga ..................... D01F 9/17
                                                   264/29.2 X
2014/0171379 A1*   6/2014  Jansen ..................... C07G 1/00
                                                   530/500 X

FOREIGN PATENT DOCUMENTS

| WO | 81/03332    | 11/1981 |
| WO | 2012/038259 | 3/2012  |
| WO | 2012/112108 | 8/2012  |

OTHER PUBLICATIONS

Cliff Eberle, "Commercialization of New Carbon Fiber Materials Based on Sustainable Resources for Energy Applications", Oak Ridge National Laboratory, Mar. 2013.
Supplementary European Search Report, European Application No. 13854547, Dated Jun. 9, 2016.

* cited by examiner

PROCESS OF MAKING CARBON FIBERS DERIVED FROM LIGNIN/CARBON RESIDUE

BACKGROUND

Technical Field

The disclosure relates to the field of carbon fibers and methods of making carbon fibers and more specifically to the field of making carbon fibers in which lignin is a precursor for the making of the carbon fiber.

Carbon fibers were first developed in 1958. Since that time, carbon fibers have found use in a wide variety of applications, including, for example, insulation, reinforced composite materials, filtration of high-temperature gasses, and additives in graphite electrodes.

Lignin, an industrial byproduct of wood-free papermaking, is one of the most abundant organic based polymers on earth. Lignin is renewable, readily available and relatively inexpensive. Currently there is a limited market for lignin. In fact less than 2% of available lignin is used in the manufacturing of industrial materials or chemicals. Lignin is a polyaromatic-polyol with extensive cross linking and strong inter- and intra-molecular interactions, hence its chemical structure is very complex. Unmodified lignin often possesses poor viscoelasticity and thermoplastic melt flow due to these interactions. Aside from these physical characteristics lignin is also highly immiscible and incompatible with non-polar media. This disclosure describes the production of carbon fibers composing mixtures of nonpolar carbon based residues and lignin.

BRIEF DESCRIPTION

A method of making a carbon fiber comprising esterification of a lignin precursor with an acid, acid anhydride, or acyl halide, thereby forming a reduced $T_g$ lignin which may be a lignin ester. Mixing the reduced $T_g$ lignin with a carbon residue selected from the group of coal based raw material, petroleum based raw material and combinations thereof, thereby forming a fiber precursor mixture; and spinning the fiber precursor mixture into a fiber.

A method of making a carbon fiber comprising esterification of a lignin with an acid derivative, thereby forming a reduced $T_g$ lignin. Mixing the reduced $T_g$ lignin with a pitch, thereby forming a fiber precursor mixture; and spinning the fiber precursor mixture into a fiber.

A method of making a carbon fiber comprising lowering the $T_g$ of a lignin material, thereby forming a reduced $T_g$ lignin. Mixing the reduced $T_g$ lignin with a carbon residue, thereby forming a fiber precursor mixture and spinning the fiber precursor mixture into a fiber.

It is to be understood that both the foregoing general description and the following detailed description provide embodiments of the disclosure and are intended to provide an overview or framework of understanding the nature and character of the invention as it is claimed.

DETAILED DESCRIPTION

The concepts disclosed herein relate to the use of lignin as a precursor for carbon products, in particular as a precursor to make carbon fiber.

Typical sources of lignin include Weyerhaeuser Co. of Washington State, Lignol Innovations of British Columbia, Canada, Mascoma of Lebanon, N.H., Virdia of Redwood City, Calif., and Fibria Cellulose of Sao Paulo, Brazil.

Lignins can be grouped into three broad classes: softwood or coniferous (gymnosperm), hardwood (dicotyledonous angiosperm), and grass or annual plant (monocotyledonous angiosperm) lignins and combinations thereof. Lignin may also be prepared from other types of biomass, including grasses, and consistent batches of lignin-rich materials recovered from the waste materials in large-scale brewing or biorefinery processes. An example of the lignin precursor includes softwood alkali lignin which may be obtained from the black liquor from softwood alkali pulping processes. In the manufacture of wood pulp, some of the lignin and hemicelluloses are solubilized and separated from the cellulose. The black liquor from the pulping process is the solubilized lignin and hemicellulose.

Hardwood feedstocks include *Acacia*; Afzelia; *Synsepalum duloificum; Albizia*; Alder (e.g. *Alnus glutinosa, Alnus rubra*); Applewood; Arbutus; Ash (e.g. *F. nigra, F. quadrangulata, F. excelsior, F. pennsylvanica lanceolata, F. Latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus heterophylla*); Cucumbertree; Dogwood (e.g. *Cornus florida, Cornus nuttallii*); Ebony (e.g. *Diospyros kurzii, Diospyros Melanida, Diospyros crassiflora*); Elm (e.g. *Ulmus americana, Ulmus procera, Ulmus thomasii, Ulmus rubra, Ulmus glabra*); Eucalyptus; Greenheart; Grenadilla; Gum (e.g. *Nyssa sylvatica, Eucalyptus globulus, Liquidambar styraciflua, Nyssa aquatica*); Hickory (e.g. *Carya alba, Carya glabra, Carya ovata, Carya laciniosa*); Hornbeam, Hophombeam; Ipe; Iroko; Ironwood (e.g. Bangkirai, *Carpinus caroliniana, Casuarina equisetifolia, Choricbangarpia subargentea, Copaifera* spp., *Eusideroxylon zwageri, Guajacum officinale, Guajacum sanctum, Hopea odorata*, Ipe, Krugiodendron *ferreum, Lyonothamnus lyonii* (*L. floribundus*), *Mesua ferrea, Olea* spp., *Olneya tesota, Ostrya virginiania, Parrotia persica, Tabebuia serratifolia*); Jacaranda; Jotoba; Lacewood; Laurel; Limba; Lignum vitae; Locust (e.g. *Robinia pseudacacia, Gleditsia triancanthos*); Mahogany; Maple (e.g. *Acer saccharum, Acer nigrum, Acer negundo, Acer rubrum, Acer saccharinum, Acer pseudopla-*

*tanus*); Meranti; Mpingo; Oak (e.g. *Quercus macrocarpa, Quercus alba, Quercus stellata, Quercus bicolor, Quercus virginiana, Quercus michauxii, Quercus prinus, Quercus mublenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); Obeche; Okoume; Oregon Myrtle; California Bay Laurel; Pear; Poplar (e.g. *P. balsamifera, P. nigra*), Hybrid Poplar (*Populus×Canadensis*); Ramin; Red cedar; Rosewood; Sal; Sandalwood, Sassafras; Satinwood; Silky Oak; Silver Wattle; Snakewood; Sourwood; Spanish cedar; American sycamore; Teak; Walnut (e.g. *Juglans nigra, Juglans regia*); Willow (e.g. *Salix nigra, Salix alba*); Yellow poplar (*Liriodendron tulipifera*); Bamboo; Palmwood; and combinations/hybrids thereof.

For example, hardwood feedstocks may be selected from *acacia*, aspen, beech, *eucalyptus*, maple, birch, gum, oak, poplar, and combinations/hybrids thereof, preferably from *Populus* spp. (e.g. *Populus tremuloides*), *Eucalyptus* ssp. (e.g. *Eucalyptus globulus*), *Acacia* spp. (e.g. *Acacia dealbata*), and combinations/hybrids thereof.

Softwood feedstocks include *Araucaria* (e.g. *A. cunninghamii, A. angustifolia, A. araucana*); softwood Cedar (e.g. *Juniperus virginiana, Thuja plicata, Thuja occidentalis, Chamaecyparis thyoides, Callitropsis nootkatensis*); Cypress (e.g. *Chamaecyparis, Cupressus Taxodium, Cupressus arizonica, Taxodium distichum, Chamaecyparis obtusa, Chamaecyparis lawsoniana, Cupressus sempervirens*); Rocky Mountain Douglas fir; European Yew; Fir (e.g. *Abies Balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*) Pine (e.g. *Pinus nigra, Pinus banksiana, Pinus contorta, Pinus radiata, Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar; fir; pine; spruce; and combinations thereof. The softwood feedstocks may be selected from loblolly pine (*Pinus taeda*) *radiata* pine, jack pine, spruce (e.g. white, interior, black), Douglas fir, *Pinus silvestris, Picea abies*, and combinations/hybrids thereof. Further, the softwood feedstocks may be selected from pine (e.g. *Pinus radiata, Pinus taeda*); spruce; and combinations/hybrids thereof.

One method disclosed here includes making a carbon product. The method includes the esterification of a lignin precursor with an acid to form a lignin ester having a reduced glass transition temperature ("reduced $T_g$ lignin"). An acid is used herein can describe compounds conventionally consider acids, such as an organic acid, or fatty acids, or acid derivative, including fatty acid derivatives, acid anhydrides, halogenated compounds, (such as but not limited to acyl halides and/or alkyl halides), and combinations thereof. The acid may include an alkyl group or an aromatic group. In a particular embodiment, the acid may comprise an acid having a longer alkyl chain than acetic acid. In another embodiment, the acid may include an ethyl group or a longer alkyl chain. In a further embodiment, the acid includes at least a propyl group. A preferred examples of a suitable acid includes a fatty acid, typically an acid having about four (4) to twenty-two (22) carbon atoms and having a terminal carboxyl group (—COOH). A preferred example of an acyl halide is an acyl chloride.

An example of an optional catalyst that may be used includes a tertiary amine, though other compounds may be suitable catalysts also. A benefit that may be realized by using such catalyst includes inhibiting thermal cross linking reactions of the lignin and/or acid catalyzed cross linking of the lignin. A general class of catalysts suitable for the disclosed esterification reactions include organic amines, in particular tertiary amines such as tri-ethyl amine, tri-methyl amine, Diazabicyclo[5.4.0]undec-7-ene, (DBU) and pyridine. A preferred temperature range for the reaction is about 0° C. and 100° C. In an embodiment of the above method, the esterification of the lignin to produce a reduced $T_g$ lignin can be performed using acid anhydrides, acyl chlorides or carboxylic acids. Esterification can be carried out typically in the presence of a suitable acid catalyst such as sulfuric acid or a Lewis acid (zinc chloride), or using a base catalyst such as pyridine, triethylamine, 1-methylimidazole, dimethylaminopyridine (though the catalyst is not necessary). Solvents such as n-methylpyrrolidinone, dimethylsulfoxide, pyridine, dioxane, or acetone can be used to dissolve the lignin if so desirable. Concentrations for the lignin in solvent may depend both upon the solvent and the molecular weight of the lignin. Suitable concentrations of the lignin can range from about 1 to 50 weight %, more narrowly 10 to 30 weight %, and preferably about 20 weight %. The esterification reaction can proceed at temperatures ranging from room temperature to the boiling point of the solvent. Complete esterification of the lignin can be achieved by conducting the reaction for as little as about 15 minutes up to about 24 hours. Preferably, the reaction time ranges from about 30 minutes to about four (4) hours.

In one embodiment, examples of esterification agents that are useful to produce the reduced $T_g$ lignin described herein include, propionic anhydride, hexanoic anhydride, acetic anhydride, butyric anhydride, valeric anhydride, hexanoic acid, lauric anhydride, and stearic anhydride.

The reduced $T_g$ lignin may be mixed with a carbon residue. The carbon residue may be selected from the group of coal based raw material, petroleum based raw material and combinations thereof. The mixture may form a carbon product precursor mixture. Examples of carbon residue include petroleum based products such as decant oil and petroleum pitch as well as coal based products such as, coal tar distillate, coal tar pitch, mesophase pitch, isotropic pitch, and combinations thereof of any of the afore petroleum and coal based products. Another example of a non-exhaustive list of carbon residues include decant oil, decant oil based pitches, coal tar pitches, petroleum pitches, coal tar distillates and combinations thereof. An example of a carbon product that may be made from such precursor mixture includes a carbon fiber. The above examples and descriptions of a carbon residue are applicable to all embodiments disclosed herein which include a carbon residue.

In a particular optional embodiment, the reduced $T_g$ lignin and the carbon residue have a similar $T_g$. A similar $T_g$ as used herein to describe two compounds which have a $T_g$ within 75° C. of each other, preferably within 65° C. of each other, more preferably within 60° C. of each other, even more preferably within about 50° C. of each other, most preferably within 45° C. of each other.

In another particular optional embodiment, the reduced $T_g$ lignin and the carbon residue have a compatible polarities or in other words the polarity of the lignin has been decreased via chemical modification. A benefit of the components having compatible polarities may be that the components are in compatible visco-elastic state as desired. One example of this is that the compounds are both in the liquid state prior to the spinning of the mixture of the reduced $T_g$ lignin and the carbon residue into a fiber. Though not to be bound to any particular theory, it is believed that the esterification of the lignin will reduce the polarity of the lignin, thereby lowering it to closer to the polarity of the carbon residue, e.g. pitch, and the two (2) materials will be more compatible.

In a further optional embodiment, it is preferred that the reduced $T_g$ lignin and the carbon residue, e.g., pitch, has a similar viscosity in a preferred temperature range. An example of a similar temperature range may be the temperature range at which the mixture is spun into a fiber, alternatively stated as the temperature range of operation of the spinneret. A benefit of this particular embodiment is that the two precursors having the similar viscosity as stated above assists with miscibility of the precursors between each other. In a further preferred embodiment, miscibility is acceptable prior to spinning and as needed during spinning for the formation of the fiber.

A third method disclosed herein includes a method of making a carbon product by lowering the $T_g$ of a lignin material, thereby forming a reduced $T_g$ lignin. The method further includes mixing the reduced $T_g$ lignin with a carbon residue, thereby forming a carbon precursor mixture. The method may also include spinning the carbon precursor material as described below. The $T_g$ of the lignin may be reduced by reacting the lignin with an alkylation agent compound or by the above described esterification. The $T_g$ of the lignin may be reduced via alkylation of the lignin. Alkylation of the lignin may be performed with a number of alkylating agents including but not limited to, for example, dimethylsulfate, $((CH_3)_2SO_4)$, dimethyl carbonate, or an alkyl halide in the presence of an appropriate base such as 1,4-diazabicyclo[2.2.2]octane (DABCO).

As for the esterification reaction, the above description regarding the acid equally applies to this method. Preferably in the case of the use of the alkylation agent, the lignin is formed into a lignin ether via alkylation of the phenol functionalities.

The above description regarding the similarity between the $T_g$ of the reduced $T_g$ lignin and the carbon residue, the polarity of the reduced $T_g$ lignin and the carbon residue and the viscosity of each precursor equally apply to this method as well.

The above particular embodiments are not mutual exclusive of each other.

In the case of making a carbon fiber, the precursor mixture may be spun into a fiber. The method is not limited to any particular method of spinning. All of the below disclosed methods of spinning the fiber are applicable to this method. This type of fiber may be referred to as a "green" fiber.

Another method disclosed herein includes the step of the esterification of a lignin with an acid derivative such as an acid anhydride or a halogenated compound, thereby forming a reduced $T_g$ lignin. The reduced $T_g$ lignin is mixed with a pitch, thereby forming a fiber precursor mixture. The pitch may be a petroleum or a coal based product. The fiber precursor mixture may be spun into a fiber. The above description of an acid also applies to this method. Such description is incorporated herein its entirety. In one particular embodiment the acid includes at least one of the following of a propyl group or longer alkyl chain, an aromatic group, and combinations thereof. In certain embodiments the acid may include a halogenated compound, acid anhydrides and combinations thereof.

The above description regarding the similarity of the $T_g$ viscosity and the polarity of the reduced $T_g$ lignin and the carbon residue also apply this second disclosed method.

The methods disclosed herein may include spinning the fiber precursor material into a fiber. The claims recited herein are not limited to any particular type of spinning. Suitable examples of how a material may be spun into a fiber include melt spinning, wet spinning (A.K.A. solution spinning), dry jet wet spinning, or centrifugal spinning. The material spun into a fiber may be referred to as a "green fiber", prior to the fiber being stabilized.

Wet spinning is the oldest process. It is used for fiber-forming substances that have been dissolved in a solvent. The spinnerets are submerged in a chemical bath and as the filaments emerge they precipitate from solution and solidify.

In dry-jet wet spinning, the precursor is extruded in fiber form from a spinneret into and through an air gap and then into a coagulation bath in which the precursor is coagulated into a fiber. The passage through the air gap is under some tension and gravity pull which creates some orientation of the precursor molecules in the lengthwise direction of the fiber. The coagulation bath also extracts the solvent from the precursor. Tension is applied to the fiber as it leaves the coagulating bath. This stretches the fiber, which improves the degree of orientation of precursor molecules in the lengthwise direction of the fiber. The fiber may pass through washing steps to remove residual solvent and is dried.

In the melt spinning, the material is heated to above its melting temperature and then extruded from the spinneret by mechanical force. The spun fibers are collected by spooling or by other methods.

Centrifugal spinning of carbon fibers includes the use of a head having an exterior shell with a plurality of apertures. A precursor material is supplied to the head in either batch or continuous manner. The precursor may be preheated, heated inside the head or a combination thereof to increase the temperature beyond the respective softening point. When the head is rotated the centrifugal force directs the material radially out the apertures of the exterior shell. The resulting fiber material is stabilized and carbonized.

For additional description regarding techniques for forming a fiber, the contents of the website http://www.fibersource.com/f-tutor/techpag.htm is incorporated herein in its entirety.

If so desired, spinning of the carbon precursor material may take place at a temperature above the $T_g$ of the precursor material. Additionally and optionally, the spinning may take place at a temperature above the softening point of the carbon precursor material. These optional embodiments apply to each and every method described above equally separately or in combination.

The fiber may be stabilized to form a thermoset fiber. One way the fiber can be stabilized is by subjecting the fiber to an oxidizing environment for a sufficient period of time to thermoset the fiber.

In alternative terms, the fibers may be stabilized by an oxidation step, such as by heating the fibers to 200-300° C. in the presence of air, to facilitate intra- and/or intermolecular crosslinking to produce thermally stabilized fibers, which prevents shrinking, melting, and fusing in carbonization. Suitable time periods for the stabilization to occur are stated above.

Typically, the stabilized fibers may be converted to carbon fiber by a carbonization process in an inert atmosphere at temperatures greater than 400° C., usually greater than 800° C., typically 1000-1500° C. Not to be limited to theory it is believed that during carbonization, a series of condensation reactions are going on and accompanied by out-gassing and weight loss. The carbonization results in the increase of carbon content to near 100%, reduction of hydrogen content to near 0%. The carbonization may also reduce heteroatom content.

Advantages of practicing one or more of the above methods include that the properties of lignin may be modified in a desired manner. If so desired, one or more of the above methods may be used to reduce the $T_g$ of the lignin. Additionally, one or more of the above methods may be used to adjust the polarity of the lignin. Further, one or more of the above methods may be used to improve the compatibility of the lignin with a carbon residue for further processing.

The glass transition temperatures for compounds can be measured on a TA Instrument Q200 digital scanning calorimeter (DSC) using Aluminum T-Zero Hermetic Pans. One method that may be employed includes cooling the samples at 10° C. per minute from room temperature to −70° C., heating the sample at 20° C. per minute to 170° C., then cooling the sample at 10° C. per minute to −75° C., and finally heating the sample at 20° C. per minute to 200° C. Glass transitions can be recorded in the second heat cycle and the DSC spectra may be obtained and the glass transition temperature can be determined therefrom. The glass transition ($T_g$) is found by plotting the heat capacity as a function of temperature. The $T_g$ is a second order endothermic transition, thus seen as a step transition (not a peak). The $T_g$ is calculated at the midpoint of this step transition as recorded by the DSC.

Applications of the carbon fiber disclosed herein includes a precursor for making insulation, felt, as an additive or filler for synthetic graphite billets or electrodes, a lithium ion battery anode, which may be in either a monolithic or powder form, an electrode for a flow battery, activated carbon fibers, such as those for a natural gas storage media or other applications for activated carbon fibers, and fillers or additives for non-conductive materials.

In the case of making insulation, the carbon fibers can be manipulated into a desired shape or configuration and combined with a binder. The composite of the carbon fibers and the binder may then be carbonized and if so desired subsequently graphitized. If so desired, the carbonization and graphitization steps may be completed in separate processing vessels and the steps may be spaced apart in time or the same processing vessel and one step may start immediately after completion of the first step. The felt may be formed in the same manner. One distinction may be that the felt precursor does not include the step of adding the binder to the carbon fibers. Additionally, the processing of make the felt may optionally include needling the carbon fibers once formed into a desired shape or configuration. The carbon fibers may be formed into a powder of desired size by milling the fibers.

Likewise, the carbon fibers may be an additive/filler for either of synthetic graphite or polymers. In the case of the synthetic graphite, the carbon fibers may be combined with coke and pitch to produce a preferred graphite billet of choice. Any known types of coke and pitch may be used in combination. The mixture of the three (3) precursors is formed to a desired shape ("the billet") and the billet is then carbonized and graphitized. If so desired, the carbonized billet may be impregnated with pitch or another carbonizable impregnant.

In the case of a polymeric resin, the carbon fiber may be added to the resin in a wet form to form a filled polymer. In an alternate embodiment, the fiber may be formed into a desired shape and used a back bone for a composite article. In this embodiment, the polymer is added to the carbon article already formed into a desired shape, thereby forming a prepreg. The prepreg is subsequently processed to form a desired product.

The various embodiments described herein can be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

EXAMPLES

The embodiments disclosed herein will now be further described by the below non-limiting examples.

Materials

Commercially available lignin and lignin derivatives were dried under vacuum overnight (70° C., 28 in Hg) prior to use in all esterification reactions. 1-methylimidazole (1MIM), pyridine, 1,4 dioxane, diethyl ether, petroleum ether, sodium bicarbonate, acetic anhydride, butyric anhydride, hexanoic anhydride, and coal tar pitches were used as received from commercially available sources.

Lignin Esterification (a) Lignin Acetate (LA)

In a 100 mL round bottom flask, two (2) grams of lignin were dissolved in four (4) grams of acetic anhydride and 0.25 ml of 1MIM. The reaction was heated in an oil bath at 60° C. (oil temp) and allowed to stir vigorously for four (4) hours, under an inert atmosphere of nitrogen. The reaction was then cooled in an ice bath and quenched with 100 mL of deionized (DI) water. The resulting precipitate was collected via vacuum filtration. The precipitate was washed three times with 100 ml of DI water and dried under vacuum (70° C., 28 in Hg) for twelve (12) hours. The esterification reactions may also be performed using pyridine or other tertiary amines as a catalyst.

(b) Lignin Butyrate (LB)

In a 100 mL round bottom flask, two (2) grams of lignin were dissolved in four (4) grams of butyric anhydride and 0.25 mL of 1MIM. The reaction was heated in an oil bath at 60° C. (oil temp) and allowed to stir vigorously for four (4) hours under an inert atmosphere of nitrogen. The reaction was then cooled in an ice bath and quenched with 50 mL of ether. The ethereal solution was washed three (3) times with 50 mL of DI water. Petroleum ether (50 mL) was then added to the ethereal solution to sediment the derivatized lignin. The precipitate was recovered via vacuum filtration and dried under vacuum (70° C., 28 inHg) for twelve (12) hours.

(c) Lignin Hexanoate (LH)

In a 100 mL round bottom flask, 5 grams of lignin were dissolved in 10 mL of hexanoic anhydride and 0.5 ml of 1MIM. The reaction was heated in an oil bath at 60° C. (oil temp) and allowed to stir vigorously overnight under an inert atmosphere of nitrogen. The reaction was then cooled to room temperature and quenched with 200 mL of a 1% sodium bicarbonate solution heated to 60° C. prior to precipitation. The bicarbonate solution was heated to 60° C. before precipitating the lignin hexanoate. The precipitates was washed with 0.1 N hydrochloric acid solution to remove pyridine. The mixture was filtered and washed repeatedly with water to remove any residual acid. The filtrate was dried in a vacuum oven at 70° C. for 24 hours to remove any residual water.

Lignin/Pitch Mixtures (Control)

Prior to mixing both the lignin and the pitch, were crushed into a fine powder and mixed until both components were evenly distributed. The solid mixtures were then heated to at least 20° C. above the softening point of the pitch and at least 20° C. above the $T_g$ of the lignin. All blends were heated and stirred vigorously under a nitrogen atmosphere for 30 minutes.

DSC Analysis

The thermal analysis of the samples was determined on a Perkin-Elmer Model DSC # Series-4 equipped with a Thermal Analysis Data Station (TADS) using standard aluminum pans. Nitrogen was used as a sweeping gas. Measurements were made on 10 mg samples in the temperature range between −10 and 200° C. at a scanning rate of 10° C./min. The glass transition temperature was reported from the second heating scan, unless otherwise indicated. The glass transition temperature ($T_g$) was taken as the temperature at the midpoint of the transition.

Softening Point

Softening points ("SP") were measured using a Mettler Toledo FP83HT Dropping Point Cell. Initial heating rates of 10° C./min were used to roughly gauge the softening point within 10° C. The initial temperature was then set to 20° C. below this point and the sample was then heated at a rate of 2° C./min to obtain a more accurate softening point. The corresponding droplets were analyzed for uniformity and shape.

Melt Spinning

Green fibers from blends and modified lignin were formed via melt spinning employing a Dynisco Laboratory Mixing Extruder (LME). Spinning experiments involving mixtures of non-modified lignin and various softening point pitches were unsuccessful at any temperature range. Extrusion experiments performed at the lower temperatures did not soften the blend sufficiently to form a continuous solid fiber. Experiments performed at high temperature led to charring of the lignin before melting occurred and here again lignin fiber could not be formed. Blends of esterified lignin and pitch could be melted and extruded at temperatures 60-100° C. higher than the corresponding $T_g$ of the blend as determined by DSC analysis or 20° C. above the softening point of the blend. Temperatures below this range lead to fibers insufficiently elastic for continuous extrusion. For example, fibers from 150° C. softening point pitch ($T_g$ 83.4° C.) were extruded at a temperature of 165-170° C.

Results and Discussion

Non-modified softwood Kraft lignin does not display a softening point at temperatures beyond its glass transition. Upon heating at temperatures above 250° C. the lignin would blacken and char. Investigations as to the compatibility of lignin with petroleum and coal based residues began with the preparation of mixtures composed of softwood Kraft lignin and 90° C. softening point (90SP) coal tar pitch. The softening point temperature of the blend increased with increasing lignin percentage for the samples with 25% and 33% lignin as compared to the 90SP pitch sample (Table 1). It was evident however that the components were highly immiscible and non-compatible no matter the concentration of the pitch. A 1:1 mixture displayed no softening point and heating of the 1:1 (50%) mixture resulted in a suspension of solid lignin particles in liquid pitch. Increasing concentrations of pitch resulted in measurable softening points however the droplets obtained were merely solid lignin particles encapsulated in solid pitch.

TABLE 1

SP of Lignin/90SP Pitch Blends

| Blend | % Lignin | SP ° C. | Meltable |
|---|---|---|---|
| SWKL | 100 | None | No |
| Lignin/90SP Pitch | 50 | None | No |
| Lignin/90SP Pitch | 33 | 137.9 | Yes |
| Lignin/90SP Pitch | 25 | 119.1 | Yes |
| 90 SP Pitch | 0 | 92 | Yes |

Figure 1:
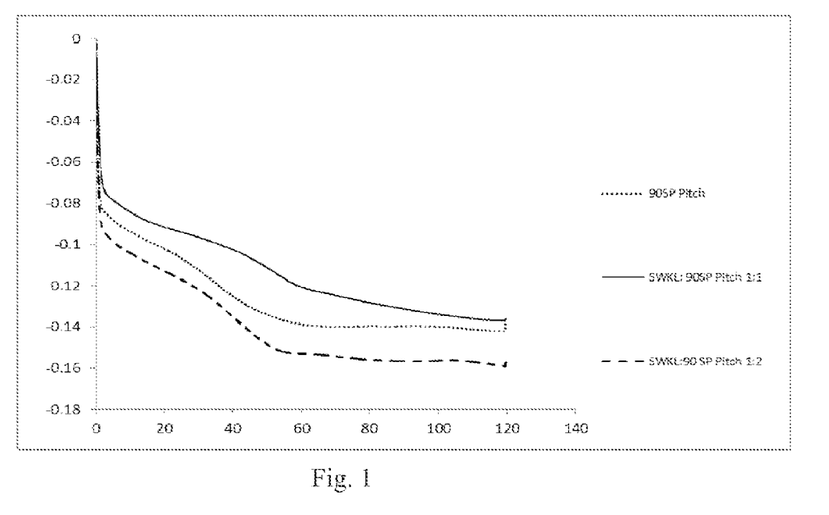
FIG. 1 illustrates digital scanning calorimeter (DSC) scans of Lignin and 90SP Pitch.

DSC analysis of the aforementioned blends only show distinct glass transitions of the pitch and glass transitions of the blend could not be detected FIG. 1. Though not to be bound by theory, it is believed that the incompatibly of non-modified lignin may arise from its high relative polarity due to hydroxyl functionalities, and the high degree of inter- and intra-molecular interactions arising from hydrogen bonding of these same functional groups. Both of these physical properties may lead to poor miscibility in non-polar media and low viscoelasticity. It is believed that esterification of the lignin as well as alkylation alters the polarity, viscoelasticity, and the glass transition temperature; furthermore the glass transition may be adjusted depending on the esterifying or alkylating moiety employed.

Esterified lignin derivatives including lignin acetate (LA), lignin butyrate, (LB), and lignin hexanoate (LH) all melted smoothly upon heating without the production of volatiles. Softening points of the corresponding lignin derivatives are given Table 2.

TABLE 2

Softening Point vs. $T_g$

| Lignin Derivative | Softening Point ° C. | Glass Transition ° C. |
|---|---|---|
| Non Modfied Kraft Lignins | none | 176-200 |
| Lignin Hexanoate | 123.7 | 72.7 |
| Lignin Butyrate | 174.4 | 100.3 |
| Lignin Acetate | 192.5 | 124.4 |

Figure 2:
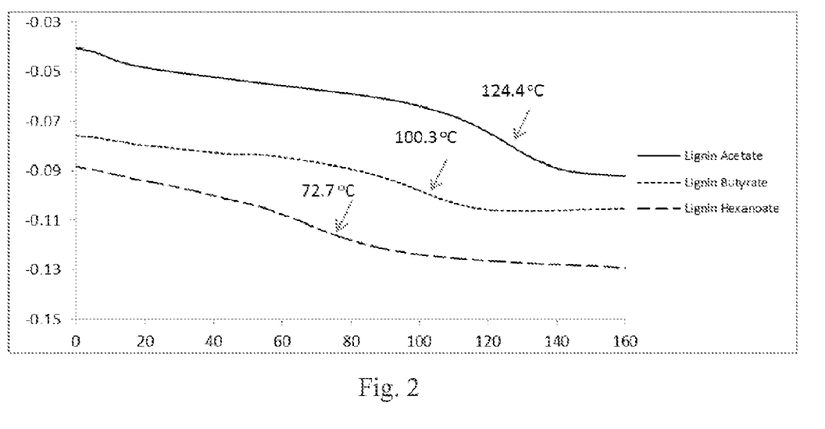
FIG. 2 illustrates DSC Scans of Esterified Lignin(s)

It is evident that there is a clear correlation, between the length of the carbon chain employed in the esterification, and the corresponding $T_g$ and the softening point of the resulting lignin polymer. This linear decrease in glass transition temperature of the lignin esters appears to be primarily due to the increase in the free volume. The droplets obtained from the softening point measurements of the modified lignins were uniform and continuous; similar to those obtained from pure pitch. The esterified lignins displayed glass transition temperatures over a wide range as shown in FIG. 2. The glass transition temperature ($T_g$) was taken as the temperature at the midpoint of the transition.

Having obtained viscoelastic lignin derivatives, the compatibility of these polymers with pitch was examined using DSC analysis. It is believed that the compatibility of these mixtures is dependent on both the glass transition of both components as well as the percentage of each component in the mixture. Fibers from mixtures of LA and 90SP could be pulled from the molten blend. 90SP pitch displayed a glass transition of 37.8° C., and it is believed that softening point pitches having higher $T_g$ temperatures may be more compatible with the modified lignins.

Figure 3:
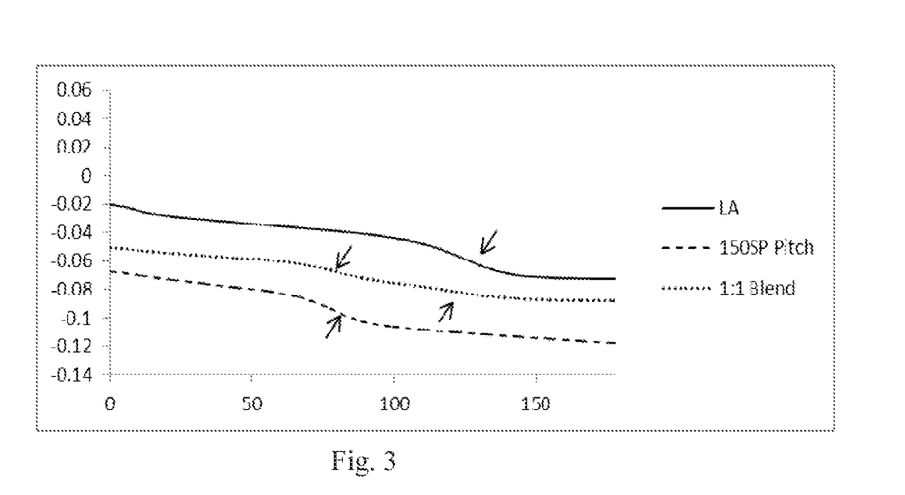
FIG. 3 illustrates DSC Scans of lignin acetate (LA) and 150SP Pitch Blend.

1:1 mixtures consisting of LA, LB, LH and 150° C. softening point (150SP) pitch were prepared and analyzed by DSC. The 150SP pitch displayed a $T_g$ of 76.5° C. as compared to LA which has a $T_g$ of 124.4° C. The resulting pitch blend obtained was more brittle with a coarse surface as compared to mixtures of 150SP pitch with LB and LH. The DSC scan of the blend displays separate transitions for both the pitch and LA (FIG. 3).

Figure 4:
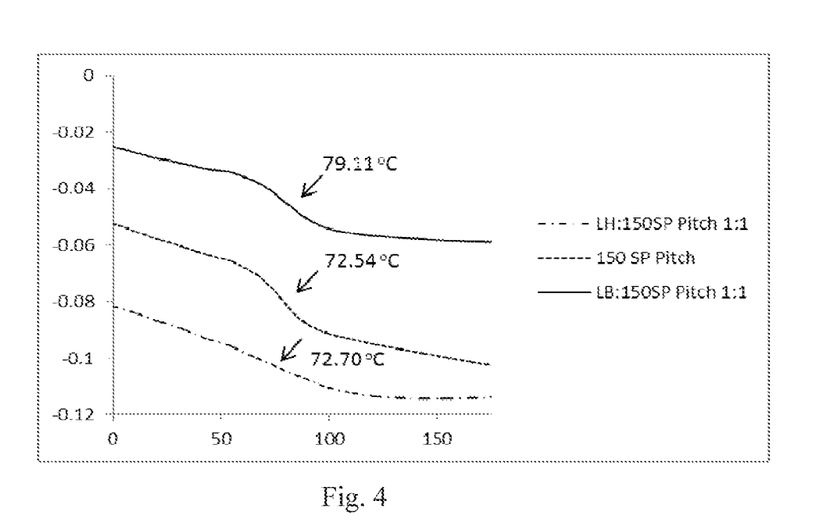
FIG. 4 illustrates DSC Scans of 1:1 lignin butyrate (LB) and lignin hexanoate (LH) Blends with 150SP Pitch.

Pitch blends obtained from 1:1 mixtures LH, LB, and 150SP pitch displayed glass transition temperatures of 72.7 and 79.1° C. respectively (FIG. 4).

Melt Spinning

Figure 5:
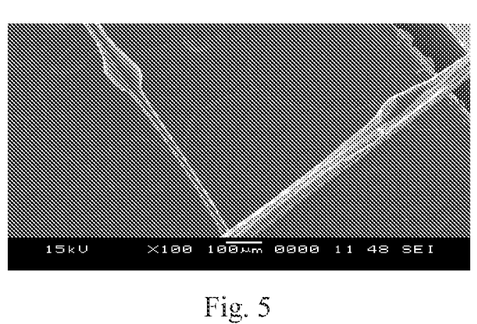
FIG. 5 illustrates a scanning electron microscope (SEM) image LA/90 SP Pitch fibers.

Blends composed of non-modified lignin blends, coal tar pitch, petroleum pitch could not be melt-spun and often led to charring. Esterification of the lignin dramatically improved the viscoelasticity of the lignin and allowed for these types of polymers to be melted and drawn into fibers. For example green carbon fibers could be obtained via melt spinning of a blend consisting of 90SP pitch and LA at temperatures between 160-170° C. The fibers obtained were brittle and could not be drawn at a rate of no greater 10 ft/min (FIG. 5).

Figure 6A:
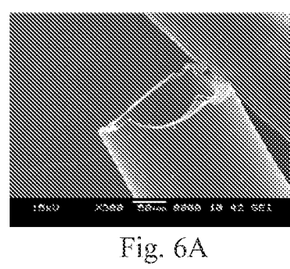
FIGS. 6A and 6B illustrate a comparison of LA and LB/Pitch fibers.
Figure 6B:
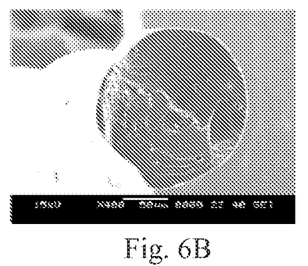

Interestingly fibers obtained from blends of lignin butyrate and 90SP pitch could be drawn at faster rates (15-20 ft/min) and were much less brittle than fibers obtained from the mixture of LA and 90SP pitch. It is believed that esterification with a longer alkyl chain further decreased the polarity and the glass transition allowing for the formation of denser more uniform fibers to be drawn (FIGS. 6A and 6B).

The analysis of softwood Kraft lignin and carbon residue blends demonstrated the incompatibility of these two polymers. However, it was found that the compatibility of lignin and pitch could be dramatically increased through esterification. The thermal properties of esterified lignins and their corresponding blends with pitch were investigated. It is believed that the compatibility of lignin esters with pitch is dependent on the glass transition temperature of both components. It was observed that blends with superior melt flow characteristics were obtained when blends constituted components of similar glass transition and polarity.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims.

Thus, although there have been described particular embodiments of the present invention of a new and useful method for making carbon fiber, it is not intended that such references be construed as limitations upon the scope of this invention except as set forth in the following claims.

What is claimed is:

1. A method of making a carbon fiber comprising:
   a. lowering the $T_g$ of a lignin material, thereby forming a reduced $T_g$ lignin;
   b. mixing the reduced $T_g$ lignin with a carbon residue, thereby forming a fiber precursor mixture; and
   c. spinning the fiber precursor mixture into a fiber.

2. The method of claim 1, wherein the lowering comprises reacting the lignin with an alkylating agent.

3. The method of claim 1, wherein the lowering comprises the esterification of the lignin.

4. The method of claim 1, wherein the lowering comprises reacting the lignin with a compound having at least one of the following of a propyl group or longer alkyl chain, an aromatic group, and combinations thereof.

5. The method of claim 1, wherein the lowering comprises reacting the lignin with a halogenated compound or an acid anhydride.

6. The method of claim 1, wherein the carbon residue is selected from group comprising decant oil, decant oil based pitches, coal tar pitches, petroleum pitches, coal tar distillates and combinations thereof.

7. The method of claim 1, wherein the $T_g$ of the reduced $T_g$ lignin is within 50° C. of the $T_g$ of the carbon residue.

8. The method of claim 1, wherein the reduced $T_g$ lignin is formed by esterification of a lignin with an acid derivative and wherein the carbon residue is from a pitch.

9. The method of claim 8, wherein the acid derivative includes at least one of the following of a propyl group or longer alkyl chain, an aromatic group, and combinations thereof.

10. The method of claim 8, wherein the acid derivative comprises a halogenated compound, or an anhydride.

11. The method of any of claim 8, wherein the $T_g$ of the reduced $T_g$ lignin is within 50° C. of the $T_g$ of the carbon residue.

12. The method of claim 1, wherein the reduced $T_g$ lignin is formed by esterification of a lignin precursor with an acid, acid anhydride, alkyl halide, or acyl halide, and wherein the carbon residue is selected from the group of coal based raw material, petroleum based raw material and combinations thereof.

13. The method of claim 12 wherein the acid comprises an acid having a longer alkyl chain than acetic acid.

14. The method of claim 12, wherein the acid includes an ethyl group or longer alkyl chain.

15. The method of claim 12 wherein the acid includes one or more selected from the group of compounds having 4 to 22 carbon atoms and a terminal carboxylic functional group.

16. The method of claim 12, wherein the reduced $T_g$ lignin and the carbon residue have a similar polarity, whereby the carbon residue and lignin have a compatible viscoelastic state at a same point in time in the method.

17. The method of claim 12, wherein the carbon residue comprises coal tar pitch or decant oil.

18. The method of claim 12, wherein the carbon residue is selected from group comprising decant oil, decant oil based pitches, coal tar pitches, petroleum pitches, coal tar distillates and combinations thereof.

19. The method of claim 12, wherein the $T_g$ of the reduced $T_g$ lignin is within 50° C. of the $T_g$ of the carbon residue.

* * * * *